April 2, 1929.  L. S. ROBERTS  1,707,320
LOCK CAP FOR CONTAINERS
Filed Feb. 14, 1928  2 Sheets-Sheet 2

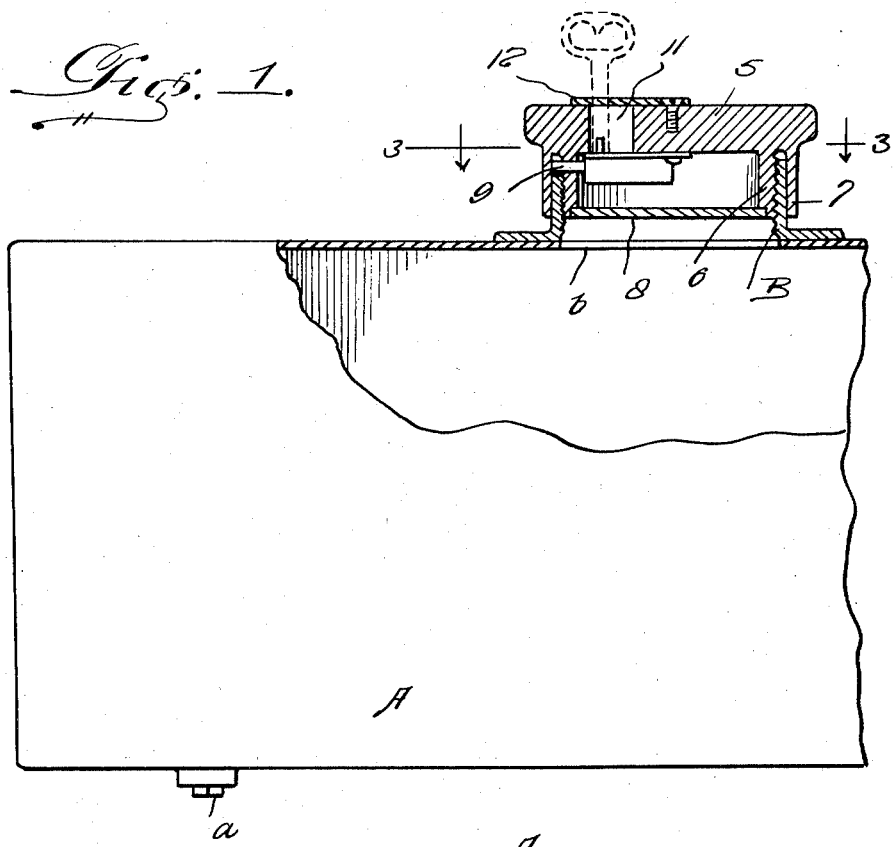
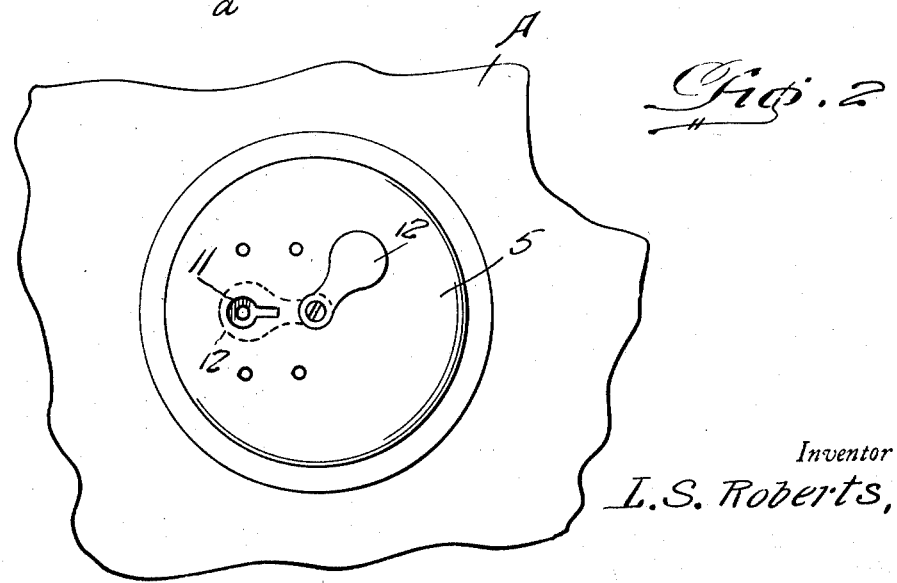

Inventor
L. S. Roberts,

By Clarence A. O'Brien
Attorney

Patented Apr. 2, 1929.

1,707,320

UNITED STATES PATENT OFFICE.

LAURENCE S. ROBERTS, OF NEW KENSINGTON, PENNSYLVANIA.

LOCK CAP FOR CONTAINERS.

Application filed February 14, 1928. Serial No. 254,291.

This invention relates to new and useful improvements in lock caps for containers such as the fuel tanks, radiators, and the like of automobiles so as to prevent theft of the cap, and also to prevent theft of the fuel in the fuel tanks.

The most important object of this invention resides in the provision of a lock cap of this variety that is extremely simple in construction, and that may be readily removed from the tank, radiator or the like by the authorized person.

In the drawings wherein there is disclosed two embodiments of the invention:

Figure 1 is a detail horizontal section through one form of cap as applied to the filler neck of an automobile fuel tank which is disclosed in cross section.

Figure 2 is a top plan view thereof.

Figure 3:
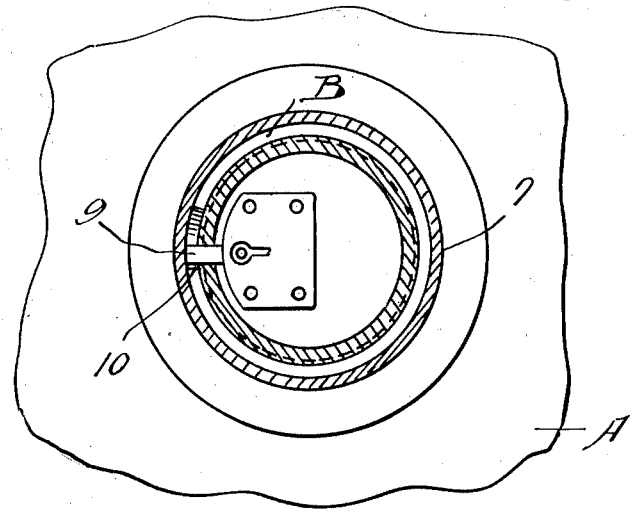
Figure 3 is a longitudinal section taken substantially upon the line 3—3 of Figure 1 and looking downwardly in the direction of the arrows.

First having reference to Figures 1 to 4, A designates a generally conventional automobile fuel tank provided at its bottom with a drain plug a. The top of the tank is provided with a filler opening b around which is arranged in accordance with the present invention a cylindrical filler neck B. This filler neck is threaded internally as disclosed. The present cap consists of a circular metallic body 5 from the under side of which depends a pair of integral and concentric cylindrical collars 6 and 7, the innermost collar 6 is externally threaded for threaded engagement within the filler neck B, while the diameter of the outermost collar 7 is such as to permit a sliding fit thereof over the outside of the neck as disclosed.

Arranged within the lower end of the innermost collar 6 is a closure plate or disc 8 for a purpose presently to be described.

The body 5 of the cap is equipped with a suitable sliding plunger lock either of the key controlled or permutation variety, the same including a sliding plunger or bolt 9 movable at its outer end through an opening in the innermost collar 6 directly beneath the bottom surface of the cap body 5 as disclosed.

The upper edge of the filler neck B is formed with a bolt or plunger receiving notch 10 through which the said plunger or bolt 9 will be forced when the same is extended outwardly into cap locking position as disclosed in Figure 1 for preventing the turning of the cap off of said filler neck.

In the event a key-controlled lock structure is associated with the cap said body 5 is formed with a key opening 11 normally closed by a swinging plate 12.

The purpose of the plate or disc 8 within the lower end of the innermost collar 6 of the cap is to prevent passage of air through the cap in which event the fuel from the tank will be drained by unauthorized parties.

Figures 4, 5:
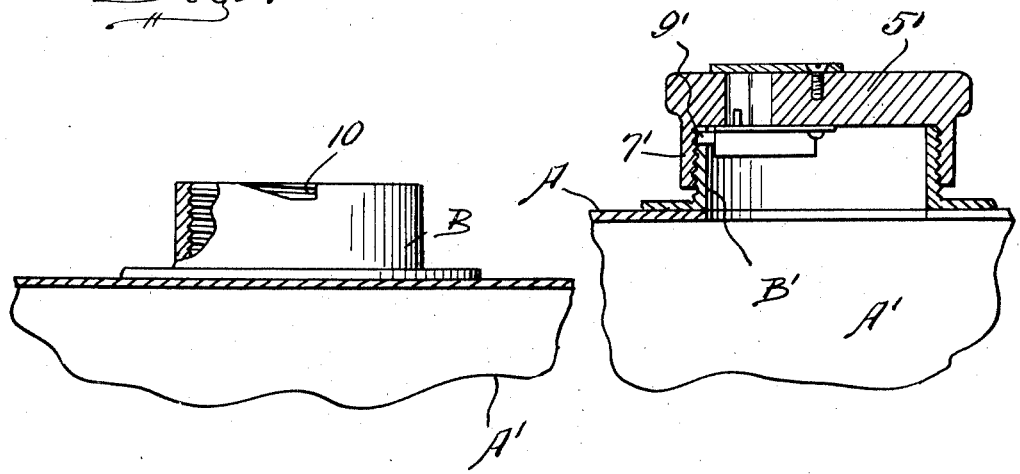
Figure 4 is a view partly in section and partly in elevation of the type of filler neck associated with the fuel tank or radiator for receiving my improved cap.
Figure 5 is a view similar to Figure 1 of a slightly modified form of cap.

As disclosed in Figure 5, should the filler neck B' of the tank A' be formed with external threads, the body 5' of the cap is formed with but one depending collar 7' threaded internally and adapted for threaded engagement with the neck as disclosed. In this instance also the upper edge of the neck is formed with a notch similar to that disclosed in Figure 4 for receiving the end of the lock bolt or plunger 9' when the same is turned outwardly.

Obviously the same character of constructions previously described and disclosed in the drawings may be associated with radiators or other containers without departing from the spirit and scope of the invention.

Even though I have herein shown and described the two forms of the invention as consisting of certain detail structural features, it is nevertheless to be understood that some changes may be made therein without affecting the spirit and scope of the appended claims.

Having thus described the invention, what I claim as new is:—

1. In a lock cap for containers, including a threaded filler neck, which neck is formed at its upper edge with a notch, said cap including a body member, a circular collar depending from the body member adjacent the periphery thereof and being threaded for threaded engagement with the filler neck, and a sliding bolt lock associated with the cap, the bolt being arranged upon the bottom surface of said body and adjacent the collar and adapted to be projected into the notch of the filler neck when the cap has been fully arranged upon said neck.

2. In a lock cap for containers, including a threaded filler neck, which neck is formed at its upper edge with a notch, said cap including a body member, a circular collar depending from the body member adjacent the periphery thereof and being threaded for threaded engagement with the filler neck, and a sliding bolt lock associated with the cap, the bolt being arranged upon the bottom surface of said body and adjacent the collar and adapted to be projected into the notch of the filler neck when the cap has been fully arranged upon said neck, said filler neck being internally threaded and said collar being externaly threaded, and a second collar formed concentrically around the first mentioned collar adapted for engagement over the outside of the neck to prevent access to said latch bolt.

In testimony whereof I affix my signature.

LAURENCE S. ROBERTS.